United States Patent
Gubarev et al.

(10) Patent No.: US 8,309,944 B1
(45) Date of Patent: Nov. 13, 2012

(54) GRAZING INCIDENCE NEUTRON OPTICS

(75) Inventors: Mikhail V. Gubarev, Huntsville, AL (US); Brian D. Ramsey, Huntsville, AL (US); Darell E. Engelhaupt, Madison, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 799 days.

(21) Appl. No.: 12/240,626

(22) Filed: Sep. 29, 2008

(51) Int. Cl.
*G02B 5/10* (2006.01)
*G01N 23/09* (2006.01)
*G01N 23/222* (2006.01)

(52) U.S. Cl. ............... 250/504 R; 250/269.4; 250/269.6
(58) Field of Classification Search ............... 250/504 R
See application file for complete search history.

(56) References Cited

U.S. PATENT DOCUMENTS

| | | | |
|---|---|---|---|
| 5,768,339 A * | 6/1998 | O'Hara | 378/147 |
| 6,927,403 B2 * | 8/2005 | Singer et al. | 250/461.1 |
| 6,964,485 B2 * | 11/2005 | Singer et al. | 359/850 |
| 7,084,412 B2 * | 8/2006 | Weiss | 250/492.2 |
| 7,091,505 B2 * | 8/2006 | Singer et al. | 250/504 R |
| 7,244,954 B2 * | 7/2007 | Singer et al. | 250/504 R |
| 7,321,126 B2 * | 1/2008 | Singer et al. | 250/492.2 |
| 7,460,212 B2 * | 12/2008 | Singer et al. | 355/53 |
| 2003/0043455 A1 * | 3/2003 | Singer et al. | 359/357 |
| 2003/0095623 A1 * | 5/2003 | Singer et al. | 378/34 |
| 2004/0065817 A1 * | 4/2004 | Singer et al. | 250/228 |
| 2004/0227103 A1 * | 11/2004 | Singer et al. | 250/492.1 |
| 2005/0094764 A1 * | 5/2005 | Weiss | 378/34 |
| 2006/0291062 A1 * | 12/2006 | Singer et al. | 359/618 |
| 2008/0042079 A1 * | 2/2008 | Singer et al. | 250/504 R |
| 2008/0121824 A1 * | 5/2008 | Kabuki et al. | 250/504 R |

OTHER PUBLICATIONS

Gubarev, M. V. et al., Nuclear Instruments & Methods in Physics Research, Beam Interactions with Materials and Atoms, An evaluation of grazing-incidence optics and neutron imaging, Dec. 2007, pp. 626-630, vol. 265. Issue 2, Elsevier.

* cited by examiner

*Primary Examiner* — Nikita Wells
*Assistant Examiner* — Johnnie L Smith
(74) *Attorney, Agent, or Firm* — Norton R. Townsley; James J. McGroary

(57) ABSTRACT

Neutron optics based on the two-reflection geometries are capable of controlling beams of long wavelength neutrons with low angular divergence. The preferred mirror fabrication technique is a replication process with electroform nickel replication process being preferable. In the preliminary demonstration test an electroform nickel optics gave the neutron current density gain at the focal spot of the mirror at least 8 for neutron wavelengths in the range from 6 to 20 Å. The replication techniques can be also be used to fabricate neutron beam controlling guides.

23 Claims, 2 Drawing Sheets

GRAZING INCIDENCE NEUTRON OPTICS

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore. In accordance with 35 U.S.C. §202, the contractor elected not to retain title.

BACKGROUND OF THE INVENTION (1) Field of the Invention

The present invention relates to the field of optics and more particularly to the field of optics for controlling, focusing and imaging of neutron beams.

(2) Description of the Related Art

The optical properties of materials are characterized by their refractive indices. In the case of cold and thermal neutrons, the refractive index is slightly less than unity for most elements and their isotopes. See V. F. Sears, Neutron Optics, Oxford University Press, 1989, 64. Consequently, thermal and cold neutrons can be reflected from smooth surfaces at shallow 'grazing-incidence' angles (total external reflection) or be refracted at boundaries of different materials.

Optical elements for neutrons can be designed to concentrate the neutron current or to produce a true image of the neutron source. An example of the former is polycapillary optics in which neutrons undergo multiple reflections from capillary walls to emerge in a new direction. See D. F. R. Mildner, H. H. Chen-Mayer, W. M. Gibson, A. J. Schultz, Proc. SPIE 4785 (2002) 43. Arrays of capillaries, with a common focus, can converge a quasi-parallel beam of neutrons to increase the current density. See H. Chen, R. G. Downing, D. F. R. Mildner, W. M. Gibson, M. A. Kumakhov, I. Yu. Ponomarev, M. V. Gubarev, Nature 357 (1992) 391. Alternatively, concave refractive lenses [see T. Cremer, M. A. Piestrup, C. K. Gary, R. H. Pantell, C. J. Glinka, Appl. Phys. Lett. 85 (2004) 494] can be used both for neutron flux enhancement and for true imaging. However, the refractive index depends on the square of the neutron wavelength so that refractive optics are strongly chromatic and high performance can only be achieved with monochromatic neutron beams. Neutron optics based on total external reflection are achromatic, but to date these have been limited to toroidal single-bounce mirror systems [see C. Hayes, C. Lartigue, A. Kollmar, J. R. D. Copley, B. Alefeld, F. Mezei, D. Richter, T. Springer, J. Phys. Soc. Jpn. 65 (Suppl. A) (1996) 312] with higher aberrations than refractive lenses, or Kirkpatrick-Baez optics [see G. E. Ice, C. R. Hubbard, B. C. Larson, J. W. L. Pang, J. D. Budai, S. Spooner, S. V. Vogel, Nucl. Instr. and Meth. A 539 (2005) 312]. The latter feature two successive reflections in orthogonal directions but their usefulness is limited to small cross-section neutron beams if high imaging performance is required.

Reflective optics based on the so-called Wolter geometries [see H. Wolter, Annalen der Physik 445 (1952) 28] that are used extensively in X-ray astronomy because they minimize optical aberrations for off-axis rays, can also be designed for use with neutron beams. The optical scheme most widely used in x-ray astronomy is a Wolter-1 geometry whereby two consecutive reflections from parabolic and hyperbolic surfaces are used to focus the X-rays, as shown in FIG. 1. The mirrors are conical section of revolution (have a "cylindrical" form), so that optics with different diameters, but the same focal length, can be nested together to increase the system throughput. Since total external reflection optics requires a near parallel incident beam, they must be placed far enough from the neutron source to ensure a small incidence beam divergence.

Nested Wolter-1 geometry optics can greatly improve the focused neutron beam intensity by increasing the incident beam area accepted by the optic while keeping the optical aberrations low. Development of an optic which can improve the focused neutron beam intensity by increasing the incident beam area accepted by the optic while keeping the optical aberrations low represents a great improvement in the field of neutron optics and satisfies a long felt need of the optical engineer.

SUMMARY OF THE INVENTION

The present invention is a grazing incidence neutron optics system which produces an image of a neutron source located at finite or infinite distance. The neutrons are focused using two consecutive reflections from smooth surfaces, the figure of which is described by the equations of the second order and their approximations. Mirrors of the same focal length can be either nested or stacked together to increase the system throughput. The mirrors are fabricated using replication processes. These can either generate the full "cylindrical" shell directly, or can generate segments of a complete optical element. The mirrors are made either from material with high neutron reflectivity or from material appropriate for the particular replication process that can then be coated with high-neutron-reflectivity material or multilayer coatings to improve the neutron reflectivity, increase the mirror acceptance angle or to extend an neutron energy range. For example, electroformed nickel replication can be used to fabricate full-shell nickel or nickel-alloy mirrors. The nickel mirror surface can be used to reflect neutrons directly or as a substrate for single or multilayer coatings.

Grazing Incidence reflective optics based on optical geometries developed for x-ray imaging and concentration can also be designed for use with neutron beams. These optical schemes utilize two consecutive reflections off specially-shaped mirrors to produce a high-quality image. The use of surfaces, the figure of which is described by the equations of the second order, such as hyperboloid, ellipsoid or paraboloid, and their approximations, for infinite and finite source distances permit near coma-free off-axis imaging. Mirrors having the same focal length can be nested or stacked together to increase the system throughput. The mirrors may be produced directly or by replication processes that can either generate the full cylindrical shell directly, or can generate segments that can then be assembled to form a complete cylindrical shell as needed.

For example, the electroform nickel replication method can be used to produce full-shell neutron mirrors providing a natural nickel reflector surface, which is known to have good neutron reflectivity. In this replication technique, pure nickel or nickel alloy mirror shells are electroformed onto a figured and super polished nickel plated aluminum cylindrical mandrel from which they are later released by differential thermal contraction. The additional use of highly reflective single or multilayer coatings on these nickel mirrors extends their use from cold, through thermal to epithermal neutron energies.

The objectives of this innovation include providing a method to control neutron beams, to produce a high-contrast high spatial resolution image of an object with high light element content using neutron beams and to provide a method to fabricate the neutron optical components.

Fine imaging of light elements by traditional (x-ray) techniques is problematic as light elements have low x-ray absorption. Neutrons have a large interaction cross section for some light elements and their isotopes and the ability to penetrate through materials with heavy-element content. This makes them highly desirable for light element imaging, but, up to now, imaging neutron optics have been mainly limited to chromatic refractive neutron lenses which require the use of single energy neutron beams.

Reflective optics based on total external reflection are achromatic, but to date these have been limited to toroidal, single bounce mirror systems produce low-quality images off axis.

In contrast to refractive optics, grazing incidence optics focus neutrons with different wavelengths to the same point. This permits the use of the optics to control broad-energy-band neutron beams.

In contrast to refractive optics in which the beam needs to pass through the refractive lens material in order to be focused, reflective optics can give near zero attenuation of the beam incident on the mirror surface below a critical angle for the total external reflection.

The use of paraboloid-hyperboloid or paraboloid-ellipsoid configurations and various approximations for infinite source distances and hyperboloid-ellipsoid or paraboloid-paraboloid configurations and various approximations for finite source distances permit near coma-free off axis imaging. Various polynomial prescriptions and defocusing techniques can be used to improve the performance of the optics.

Conical approximations to the Wolter geometries are possible, simplifying the fabrication of neutron optics and significantly reducing costs. Use of grazing incidence optics permits both finite and infinite source and focal distances.

Replication techniques permit multiple copies from a single master, leading to reduced fabrication costs.

The replication techniques can also be used for fabrication of optical elements utilizing multiple neutron reflections such as neutron wave guides.

The optics can be used to produce a concentrated point neutron source, particularly if a pinhole collimator is placed at the focal spot to reduce the effects of a divergent incident beam.

The mirrors can be used directly as reflectors or as a substrate for additional optical coatings. These coatings could be a single layer with high neutron reflectivity, such as Ni58, or multiple layers of different materials designed to increase the field of view of the mirror or to extend the neutron wavelength range. The multilayer coating on the mirror can be also used as a monochromator. The coatings do not have to be applied inside the cylindrical mirrors, but can be applied to the mandrel before the shell is formed.

The use of the neutron optics for material analysis and imaging increases the signal to noise ratio through their inherent flux concentration.

Very-thin neutron mirrors can be fabricated, so small angle neutron scattering in the mirror material itself can be substantially decreased.

Neutron radiation surveillance, mapping and detection can potentially be made more accurate and precise using the system of the present invention.

Neutron optics used in medical imaging and therapies can increase the spatial resolution of images and reduce the radiation dose to the patient.

The use of the replication technique as described in this document would permit the fabrication of lower-cost neutron guides and optics for nuclear reactors.

Neutron optics can be used in biological research to potentially improve the contrast and resolution of images.

Neutron optics can be used for beam concentration to improve neutron micro-probe techniques for material analysis.

Neutron optics can be used in small-angle scattering and diffraction experiments to improve material and structure analysis accuracy.

Neutron optics will allow remote probing of geological regolith to search for light element resources such as oil and water.

Neutron optics could be used for land mine field mapping to reduce human fatalities.

Because the grazing incidence critical angle depends on the neutron wavelength, neutron optics can be used to separate neutrons with different energies as well as to separate neutrons from other radiation such as gamma rays.

The presence of water on planets can also be inferred from neutron measurements. Produced at high energies in the lunar or Martian regolith by the action of cosmic rays, neutrons are slowed down to low or thermal energies through collisions with light elements, such as the hydrogen in water. An increase in thermal neutrons, and a corresponding decrease in epithermal ones, measured for example from orbit, indicates the possibility of substantial water deposits. The lunar prospector mission, using crudely collimated neutron detectors with ~100 km surface resolution, detected a substantial decrease in epithermal neutrons at the lunar poles. The use of neutron optics can substantially increase the signal-to-noise ratio and can also improve the spatial accuracy for these neutron mapping measurements.

Grazing-incidence optics can also be used to focus neutrons in small angle neutron scattering (SANS) experiments. Here, the beam penumbra can be significantly decreased by arranging for the focus to be at the detector, resulting in lower values of obtainable scattering angles. The high efficiency of the optics permits a decrease in the minimum scattering vector without lowering the neutron intensity on sample. In this application, a significant advantage of the reflective optics over refractive optics is that the focus is independent of wavelength, so that the technique can be applied to polychromatic beams at pulsed neutron sources.

An appreciation of the other aims and objectives of the present invention and an understanding of it may be achieved by referring to the accompanying drawings and description of a preferred embodiment.

DETAILED DESCRIPTION OF THE PREFERRED EMBODIMENT

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
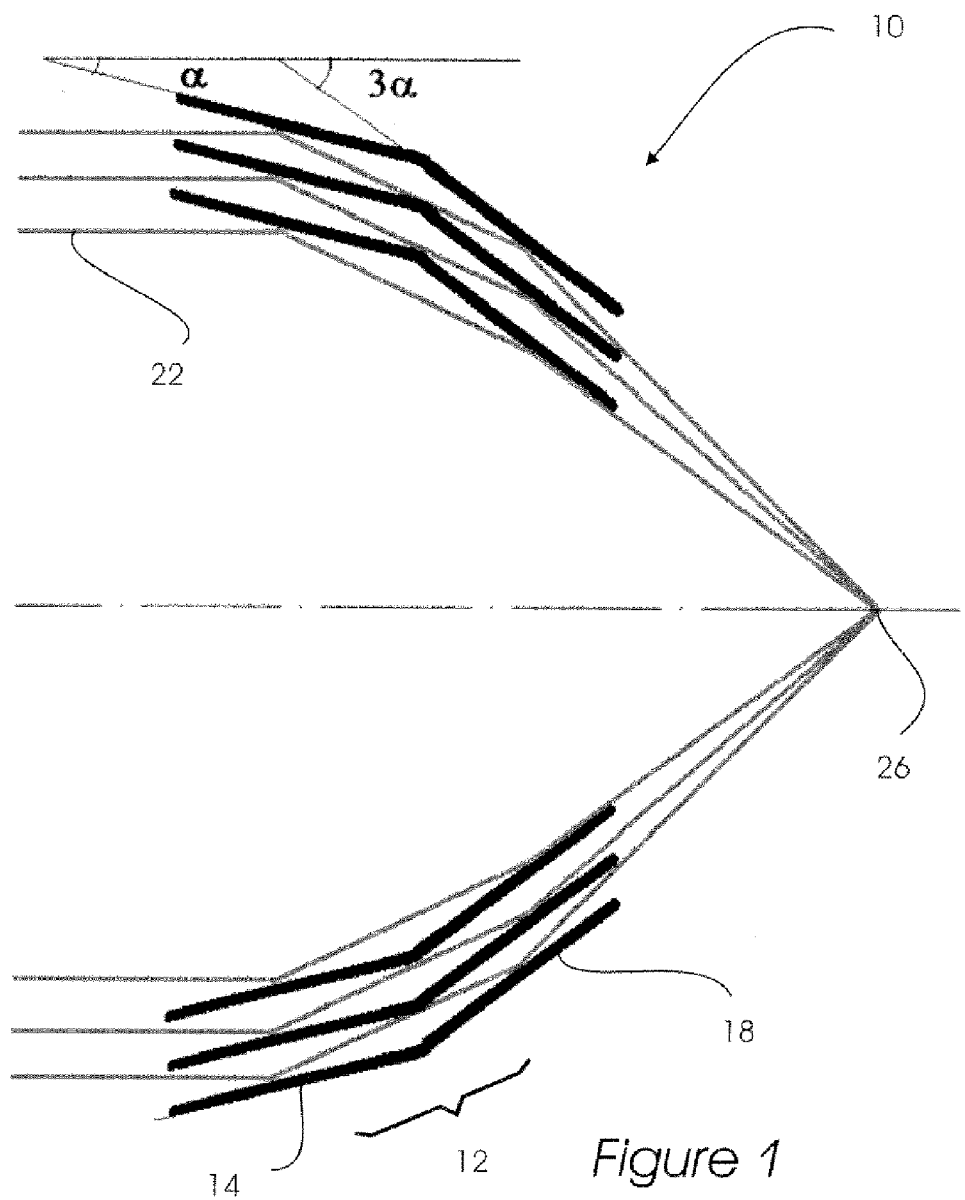
FIG. 1 is a cross-section of an optical system based on the Wolter-1 geometry.

FIG. 1 shows a cross-section of an optical system 10 based on the Wolter-1 geometry. This geometry comprises at least one and preferably a set of cylindrical mirrors 12. Each mirror has a paraboloid section 14 at an angle $\alpha$ to the incident radiation 22, and a hyperboloid section 18, at an angle $3\alpha$ to the incident radiation. This causes the incident radiation to focus at a focal point 26. The sections 14, 18 must be different but can be paraboloid, hyperboloid or ellipsoid in shape. The configuration shown has a set of concentric mirrors 12.

One technique used to produce mirrors 12 is the electroformed nickel replication (ENR) process, which was developed for hard-X-ray astronomy. See B. D. Ramsey, R. F. Elsner, D. E. Engelhaupt, M. Gubarev, J. J. Kolodziejczak, S. L. O'Dell, C. O. Speegle, M. C. Weisskopf, Proc. SPIE 5168 (2003) 129. In this technique, pure nickel or nickel-alloy mirror shells 12 are electroformed onto a figured and super polished, nickel-plated aluminum cylindrical mandrel from which they are later released by differential thermal contraction. The resulting cylindrical mirror 12 can have a monolithic structure that contains both segments 14, 18.

An existing 62-mm diameter, 175-mm long, 1-m focal length mandrel was used to fabricate mirror shells for neutron beam test. This was originally designed as a 1/10-scale version of the innermost mirror of NASA Chandra X-Ray Observatory. The parabolic surface is at an angle α=8.0 mrad, and therefore this optic has appropriate grazing angles for cold neutron reflection. It should be understood that other angles would also be appropriate depending on wavelength of the incident radiation and other factors. In the preferred embodiment, the critical angle for total external reflection of neutrons is 1.73 mrad $Å^{-1}$ for a natural nickel surface, so that the cut-off wavelength for this optic is 4.6 Å for on-axis trajectories. From measurements of the mirror mandrel it was estimated that the microroughness of the final mirror surface is less than 5 Å root mean square (rms).

An evaluation of the X-ray performance of the mirror was carried out at the Stray Light Facility at Marshall Space Flight Center. The optic was placed 100 m from a 0.2-mm-diameter X-ray source, mounted on tip-tilt stages to aid alignment, and a pinhole-collimated X-ray detector was located at the focal position. The half-power diameter of the mirror for an energy range from 6 to 8 keV, calculated from flux measurements within different pinhole diameters, was found to be 0.140±0.003 mrad, which corresponds to a focal spot size of about 140 μm diameter. A comparable focal spot size for a neutron beam would be expected, but only if the beam has a divergence similar to the micro-radian level divergence of the test X-ray beam.

Figure 2:
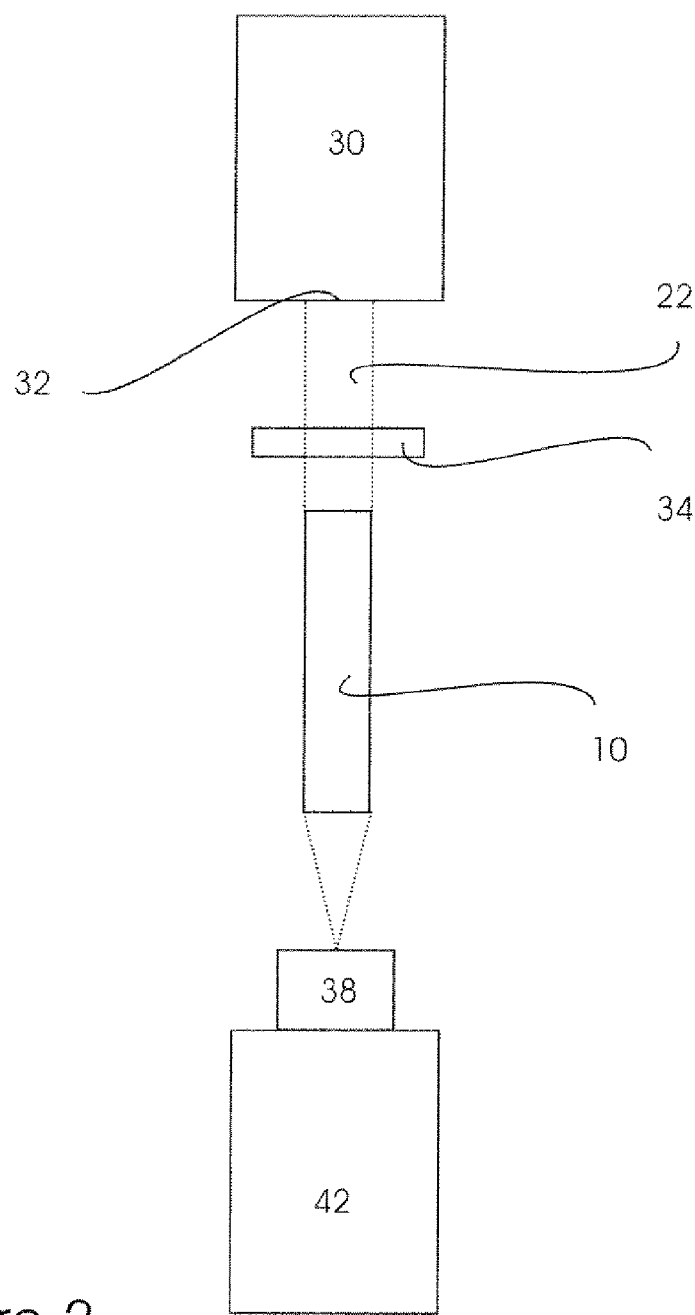
FIG. 2 is a sketch of the test setup.

FIG. 2 shows the test setup used for neutron beam evaluation of this optic 10. The neutron performance of the test optic was evaluated using the NG-7 Small-Angle Neutron Scattering (SANS) instrument [see C. J. Glinka, J. G. Barker, B. Hammouda, S. Krueger, J. J. Moyer, W. J. Orts, J. Appl. Cryst. 31 (1998) 430] at the National Institute of Standards and Technology's Center for Neutron Research as the source 30 of a quasi-parallel neutron beam 22. The available neutron wavelength range, 5-20 Å, permits a demonstration with wavelengths close to the mirror 12 cut off. The test optic 10 was installed horizontally on the same stages that were used for the X-ray evaluation and the assembly was placed immediately after the exit gate 32 of the neutron source 30. A plate 34 made from boron nitride of thickness 13 mm with an annular aperture was placed between the optic 10 and the exit gate 32. The aperture extent was slightly larger than the maximum beam diameter of 25 mm available at NG-7. Because of this finite beam size, the beam was only illuminating the top portion of the optic, corresponding to a geometric area of approximately 18 $mm^2$. The detector 38 was a $He^3$ position sensitive proportional counter with 128×128 pixels, each 5 mm×5 mm in area, positioned at a controllable distance from the optic 10 and attached to a detector system 42.

A direct measurement of the focal spot size of the optic 10 was not possible because the spatial resolution of the SANS detector 38 was much poorer than the expected focal spot size. Moreover, the configuration of the instrument sample area is such that the closest distance between the optic 10 and the detector is slightly greater than the optic 10 focal distance of 1 m.

The optic 10 focal spot size can, however, be estimated from measurements of the extra-focal annular width. The neutron beam reflected from the optic 10 forms a shrinking annulus which projects to a nominal point at the optic focus 26 and then expands again beyond this. A series of measurements at various detector 38 to focal spot 26 distances can demonstrate this focusing (or in this case de-focusing) action of the neutron mirrors 12. With the optic 10 installed immediately after the exit gate 32, the detector 38 can be positioned at any distance between 1.65 m and 17.65 m from the center of the optic 10. The Wolter-1 geometry calls for the tilt angle 3α of the hyperbolic section 18 to be three times larger than the tilt angle α of the parabolic section 14 of the mirror 12 to preserve the graze angle throughout (see FIG. 1). Having two mirror sections 14, 18 for each conical mirror 12 means that in some circumstances there can be up to three components to the reflected beam: (1) the expected double-bounce component where neutrons reflect from the parabolic 14 and then the hyperbolic 18 sections; (2) a single-bounce component where neutrons reflect from the parabolic stage 14 only; and (3) a single component from the hyperbolic stage 18 only. Component (2) arises in cases where the incoming beam 22 is divergent or off-axis, and the increase in graze angle from the first section 14 causes some neutrons to miss the second section 18 altogether. Component (3) is always present if the critical angle for the neutron beam 22 is greater than the grazing angle at the hyperbolic section 18. In an optimum nested system of mirrors 12, however, this component is greatly suppressed because the hyperbolic segment 18 of the mirror 12 is shaded by the parabolic segment 14 of the next inner mirror (see FIG. 1). Note also that beam component (3) comes to a focus before the true [component (1)] focus position, and then expands into a narrow (mm-wide) annular ring which is about ½ the diameter of the optic 10 at the true focus position. Thus, it typically contributes little to the true image even for un-optimized mirror systems. It can be, however, totally blocked by placing a small absorber at the component (3) focus position.

For the neutron optics evaluation tests, the optic 10 was aligned with the NG-7 quasi-parallel beam 22 using 10 Å neutrons and with all the neutron guides of the instrument inserted. The critical angle of the nickel surface of the guides determines the divergence of the neutron beam (17.3 mrad for 10 Å neutrons). This divergence is much larger than the tilt angle α (8.0 mrad) of the parabolic section 14 of the mirror 12.

The performance of the optic 10 has been investigated with measurements taken at neutron wavelengths of 6 Å, 10 Å and 20 Å, each with a bandwidth of about 11%. All the neutron guides were moved out to obtain the lowest possible beam divergence, with the size of the first aperture of the collimation reduced to 14 mm, while the exit aperture remained at 25 mm in diameter. The optic 10 was located about 15 m from the 14 mm aperture, so that the neutron beam 22 divergence for this configuration was estimated to be less than 1 mrad. Annular images were collected for each wavelength at optic 10 to detector 38 distances of 1.65, 3.65 and 5.65 m, corresponding to detector 38 to mirror focal spot 26 distances of 0.67, 2.67 and 4.67 m, respectively. Using the images taken at the 4.67 m optic 10 to detector 38 distance and taking into account the 5 mm pixel size the projected area of the neutron-beam footprint for the optic parabolic section 14 which produces the true [component (1)] focus was calculated by triangulation to be 17.7 mm². The double-bounce annular [component (1)] width was also estimated from the images taken at the 5.65 m detector 38 to optic 10 distance position. The total length of the annular image was found to be 23 pixels using summed multiple pixels to improve statistics. To estimate the full width at half maximum (FWHM) of the radial annulus size, a measure of the angular resolution of the optic 10, a Gaussian curve was fit to the profile of the annulus. The angular size of the annulus was found to be ~1.15 mrad for all three wavelengths. At the focal distance of 1 m, this angular size corresponds to a focal-spot size (FWHM) of about 1.15 mm, about a factor of eight greater than that derived from the X-ray test data. Note, however, that the dominant factor here is the divergence of the incident beam 22 which was estimated to be about 1 mrad, close to the measured resolution of the optic 10.

To measure the neutron flux in the incident beam, the optic 10 was replaced with a 6.4-mm diameter pinhole made in a boron nitride plate. The resulting incident beam intensity was used to calculate the effective area of the optic 10, i.e. the incoming beam 22 cross-sectional area that would contain the same number of neutrons as in the mirror double bounce annular image. The gain in neutron current density achieved by virtue of the focusing action of the optic 10 assuming the mirror focal spot 26 size was 1.15 mm (FWHM) is shown in Table 1. The effective-area measurements are in good agreement with the calculated area of 17.7 mm², indicating that the neutron beam 22 was focused without loss. Any residual cross-contamination between components, which could affect the effective area calculations, is estimated to be below the 0.4% level.

TABLE 1

The effective area and gain measured for the test mirror

| Neutron wavelength (Å) | Effective area (mm2) | Gain |
| --- | --- | --- |
| 6 | 17.9 ± 0.4 | 8.5 |
| 10 | 17.1 ± 0.2 | 8.2 |
| 20 | 15.8 ± 1.6 | 7.6 |

The gain in neutron current density at the mirror focal spot 26 is estimated to be ~8.1 (±0.5) for all three wavelengths.

With the mirror wall thickness about 1 mm, the total footprint area of the optic 10 in the beam 22, which includes the projected area of the optic footprint for the parabolic section 14 and the wall area, is only 44 mm². The use of nested mirrors 12 can improve the neutron current density gain by approximately an order of magnitude, even in the case of this 25-mm-diameter divergent beam 22.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An optical device for controlling a quasi-parallel beam of incident neutrons, comprising:
  a source for said quasi-parallel beam of neutrons; and
  a conical section of revolution mirror having a first section at one end transitioning to a second section at its other end; said first section having a first longitudinal curvature; said second section having a second longitudinal curvature; said quasi-parallel beam of neutrons being incident on said first section; a focal spot being spaced apart from said second section.

2. An optical device as claimed in claim 1 in which said first longitudinal curvature is selected from the group consisting of paraboloid, hyperboloid, ellipsoid, approximately hyperboloid, approximately ellipsoid, approximately paraboloid and approximately polynomial.

3. An optical device as claimed in claim 1 in which said second longitudinal curvature is selected from the group consisting of paraboloid, hyperboloid, ellipsoid, approximately hyperboloid, approximately ellipsoid, approximately paraboloid and approximately polynomial.

4. An optical device as claimed in claim 1 in which said first longitudinal section and second longitudinal section are at different angles to said incident neutron beam.

5. An optical device as claimed in claim 1 in which the angle of the second longitudinal section to said incident neutron beam is approximately three times the angle of the first longitudinal section to said incident neutron beam.

6. An optical device as claimed in claim 1 in which said conical section of revolution mirror is coated with a material with high neutron reflectivity.

7. An optical device as claimed in claim 6 in which said material is selected from the group consisting of pure nickel, nickel alloy and nickel isotopes.

8. An optical device as claimed in claim 7 in which said material is formed to shape.

9. An optical device as claimed in claim 1 in which said conical section of revolution mirror is made from a material with high neutron reflectivity.

10. An optical device as claimed in claim 8 in which said material is selected from the group consisting of pure nickel, nickel alloy and nickel isotopes.

11. An optical device as claimed in claim 7 in which said material is electroformed to shape.

12. An optical device as claimed in claim 1 in which the microroughness of the reflective surface of said mirror is less than 25 Å rms.

13. An optical device as claimed in claim 1 in which the microroughness of the reflective surface of said mirror is less than 5 Å rms.

14. An optical device for controlling a quasi-parallel beam of incident neutrons, comprising:
  a source for said quasi-parallel beam of neutrons; and
  a plurality of concentric conical section of revolution mirrors each having a first section at one end transitioning to a second section at the other end; said first section having a first longitudinal curvature; said second section having a second longitudinal curvature; said quasi-parallel beam being incident on said first sections; a focal spot being spaced apart from said second section.

15. An optical device as claimed in claim 14 in which said first longitudinal curvature is selected from the group consisting of paraboloid, hyperboloid, ellipsoid, approximately hyperboloid, approximately ellipsoid, approximately paraboloid and approximately polynomial.

16. An optical device as claimed in claim 14 in which said second longitudinal curvature is selected from the group consisting of paraboloid, hyperboloid, ellipsoid, approximately hyperboloid, approximately ellipsoid, approximately paraboloid and approximately polynomial.

17. An optical device as claimed in claim 14 in which first longitudinal section and second longitudinal section are at different angles to said incident neutron beam.

18. An optical device as claimed in claim 14 in which the angle of said second longitudinal section to said incident neutron beam is three times the angle of said first longitudinal section to said incident neutron beam.

19. An optical device as claimed in claim 14 in which said conical section of revolution mirror is made from a material with high neutron reflectivity.

20. An optical device as claimed in claim 14 in which said material is selected from the group consisting of pure nickel, nickel alloy and nickel isotopes.

21. An optical device as claimed in claim 19 in which said material is electroformed to shape.

22. An optical device as claimed in claim 14 in which the microroughness of the reflective surface of said mirror is less than 25 Å rms.

23. An optical device as claimed in claim 14 in which the microroughness of the reflective surface of said mirror is less than 5 Å rms.

\* \* \* \* \*